United States Patent [19]

Degnan et al.

[11] Patent Number: 4,550,090

[45] Date of Patent: Oct. 29, 1985

[54] REGENERATION OF ZSM-5 TYPE CATALYST WITH A SOURCE OF ALKALI OR ALKALINE EARTH METAL CATIONS OR AMMONIA

[75] Inventors: Thomas F. Degnan, Yardley, Pa.; Malvina Farcasiu, Princeton, N.J.

[73] Assignee: Mobil Oil Corporation, New York, N.Y.

[21] Appl. No.: 659,505

[22] Filed: Oct. 10, 1984

Related U.S. Application Data

[63] Continuation of Ser. No. 526,847, Aug. 26, 1983, abandoned.

[51] Int. Cl.[4] .................... B01J 29/38; C10G 47/16; C10G 47/20; C10G 11/05

[52] U.S. Cl. ........................ 502/25; 208/27; 208/111; 502/26; 502/30; 502/31; 502/33; 502/54; 502/515; 502/518

[58] Field of Search ............... 502/25, 26, 30, 31, 502/33, 54, 515, 518

Primary Examiner—P. E. Konopka
Attorney, Agent, or Firm—Alexander J. McKillop; Michael G. Gilman; Dennis P. Santini

[57] ABSTRACT

A novel method is provided for regenerating deactivated crystalline zeolite catalysts at low temperature. The organic residue is contacted with a source of alkali or alkaline earth metal cations, or a source of ammonia, and the organic residue, including nitrogenous compounds, is extracted with an organic solvent. The method is particularly useful with deactivated ZSM-5 type dewaxing catalyst.

17 Claims, No Drawings

REGENERATION OF ZSM-5 TYPE CATALYST WITH A SOURCE OF ALKALI OR ALKALINE EARTH METAL CATIONS OR AMMONIA

This is a continuation of copending application Ser. No. 526,847, filed on Aug. 26, 1983, now abandoned.

FIELD OF THE INVENTION

This invention in its broad aspect is concerned with the regeneration of an acidic zeolite catalyst that has become deactivated in use. It is particularly concerned with regenerating an intermediate pore size catalyst that has become deactivated in a hydrocarbon conversion process. It is more particularly concerned with regenerating a ZSM-5 type catalyst that has become deactivated with use as a dewaxing catalyst.

PRIOR ART

Heterogeneous acidic oxides are used extensively in the petroleum and petrochemicals industry to catalyze a variety of hydrocarbon conversions. These conversions include catalytic cracking, hydrocracking, naphtha reforming, benzene alkylation, xylene isomerization, catalytic dewaxing, and other conversions.

During use, as is generally known, the catalysts undergo loss of catalytic activity, selectivity, or both. The time required for the activity to decay to the point at which the catalyst is no longer useful may vary from as little as a few minutes, as in catalytic cracking, to several years, as with some versions of naphtha reforming. Some of the factors which affect the aging rate include the nature of the feed, the nature of the catalyst, and process conditions. In general, catalyst deactivation is accompanied by an accumulation of organic matter on the catalyst, and it was early learned to regenerate deactivated catalysts by burning the organic matter in an oxygen-containing gas.

Catalytic dewaxing is described for example in U.S. Pat. Nos. Re. 29,398, 3,852,189 and 3,956,102 to Chen et al. These U.S. Patents are incorporated herein by reference as if fully set forth. In the 3,956,102 Patent, regeneration of a dewaxing catalyst by burning in oxygen is disclosed at column 4, but disclosed at column 7 is that the same catalyst may be reactivated by treatment in hydrogen for about 24 hours at 400 psig. U.S. Pat. No. 4,358,395 to Haag et al. discloses that a ZSM-5 type catalyst which has undergone controlled precoking and has become deactivated in a methanol conversion process, is reactivated at 800° F. to about 1200° F. in an atmosphere containing hydrogen. This patent also is incorporated herein by reference.

Although burning in an oxygen-containing gas and treatment with hydrogen are known to regenerate catalysts, these processes in general require high temperature and are costly. In the case of regeneration with hydrogen, special metallurgy is required. And finally, these regenerations often do not restore all of the properties of the virgin catalyst.

It is an object of this invention to provide a novel process for regenerating a zeolite catalyst that has become deactivated by use. It is a further object to provide a process for regenerating a zeolite catalyst at a temperature substantially less than 800° F. It is a further object of this invention to provide a process for regenerating a ZSM-5 type catalyst that has become deactivated by use as a dewaxing catalyst. These and further objects will become evident on reading this entire specification including the appended claims.

BRIEF SUMMARY OF THE INVENTION

We have now discovered that most of the accumulated organic matter on an acidic zeolite catalyst that has become deactivated by use is removed by extraction with an organic solvent if the catalyst is contacted with a source of alkali or alkaline earth metal cations, ammonia, or mixtures of these, all as more fully described below. The described contacting step makes the tenaciously sorbed nitrogen compounds extractable. The contacted and extracted catalyst is reconverted to the hydrogen form by conventional means to provide regenerated cataylst.

DETAILED DESCRIPTION INCLUDING BEST MODE

It is contemplated to regenerate by the method of this invention any regenerable acidic zeolite catalyst that has become deactivated in use. The term "regenerable", as used herein, refers to a catalyst that is regenerable by a conventional method such as by burning off the carbonaceous residue. The term "acidic" as used herein refers to any zeolite catalyst that is capable of inducing what is recognized in the art as an acid catalyzed reaction. Examples of acid catalyzed reactions include xylene isomerization, benzene alkylation, cumene dealkylation, double bond shift, etc. Catalysts incorporating zeolite X, zeolite Y, erionite and mordenite are contemplated as within the scope of this invention.

This invention is particularly useful with catalysts based on zeolites of intermediate pore size.

The preferred crystalline zeolites of intermediate pore size are members of a novel class of zeolites that exhibit unusual properties. Although these zeolites have unusually low alumina contents, i.e. high silica to alumina ratios, they are very active even when the silica to alumina ratio exceeds 30. The activity is suprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalyst, generally have low coke-forming activity and therefore are conducive to long times on stream between regenerations.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination: a silica to alumina mole ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The preferred zeolites useful in this invention have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the desired type. Windows of 10-membered rings are preferred, although in some instances excessive puckering of the rings or pore blockage may render these zeolites ineffective. 12-membered rings usually do not offer sufficient constraint to produce the advantageous conversions, although the puckered 12-ring structure of TMA offretite shows constrained access. Other 12-ring structures may exist which, due to pore blockage or to other cause, may be operative.

Rather than attempt to judge from crystal structure whether or not a zeolite possesses the necessary constrained access to molecules larger than normal paraffins, a simple determination of the "Constraint Index", or C.I., as herein defined may be made by passing continuously a mixture of an equal weight of normal hexane and 3-methylpentane over a small sample, approximately one gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The C.I. is calculated as follows:

$$C.I. = \frac{\log_{10}(\text{fraction of n-hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of 1 to 12. C.I. values for some typical zeolites are:

| CAS | C.I. |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| H—Zeolon (mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different Constraint Indexes. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove and found to have a Constraint Index of 1 to 12 is intended to be included in the instant catalyst definition regardless that the same identical zeolite tested under other defined conditions may give a Constraint Index value outside of 1 to 12.

The class of zeolites defined herein is exemplified by ZSM-5, ZSM-11, ZSM-12, ZSM-21, ZSM-23, ZSM-35, ZSM-38, ZSM-48, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particulary described in U.S. Pat. No. 4,046,859, the entire content of which is incorporated herein by reference.

The specific zeolites described, when prepared in the presence of organic cations, are substantially catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this type zeolite; however, the presence of these cations does appear to favor the formation of this special class. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline zeolites are ZSM-5, ZSM-11, ZSM-12, ZSM-21, ZSM-23, ZSM-35, ZSM-38, and ZSM-48, with ZSM-5 and ZSM-11 particularly preferred. In some instances, it is advantageous to steam the fresh zeolite to reduce its activity and thereby improve its selectivity prior to use. Such improvement has been noted with steamed ZSM-5.

In a preferred aspect of this invention, the zeolites selected are those having a crystal framework density, in the dry hydrogen form, of not less than about 1.6 grams per cubic centimeter. It has been found that zeolites which satisfy all three of these criteria are most desired. Therefore, the preferred zeolites of this invention are those having a Constraint Index as defined above of about 1 to 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, Apr. 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent not sorbed by the crystal. Or, the crystal density may be determined by mercury porosimetry, since mercury will fill the interstices between crystal but will not penetrate the intracrystalline free space. It is possible that the unusual sustained activity and stability of this class of zeolites is associated with its high crystal anionic framework density of not less that about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, 11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4, Omega | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable metal cations of Groups I through VIII of the Periodic Table, including, by way of example, nickel, copper, zinc, palladium, calcium or rare earth metals.

The catalyst referred to herein often contain crystalline zeolite in a matrix material resistant to the temperature and other conditions employed in the process. Such matrix materials include synthetic or naturally occuring substances as well as inorganic materials such as clay, silica and/or metal oxides. The latter may be either naturally occurring or in the form of gelatinous precipitates or gels including mixtures of silica and metal oxides. Naturally occurring clays which an be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

We shall now illustrate the regeneration method of this invention by reference to specific examples. These example are not intended to limit the scope of this invention, but rather to illustrate the nature of the invention.

In the examples which follow, the term "reactivated", is applied to catalysts treated by the method of this invention with marked reduction in the content of organic residue including nitrogenous residue. Use of this term does not imply that the catalyst has been converted to the hydrogen form, which may be necessary for a satisfactory regeneration.

EXAMPLES

Example 1

This Example illustrates regeneration of a deactivated dewaxing catalyst by burning in air (prior art), with and without prior solvent extraction to remove loosely held residue.

A fresh dewaxing catalyst consisting of 1.1% nickel on a 1/16" extrudate composed of 65 wt% ZSM-5 zeolite 35% alumina binder was charged to a catalytic reactor. A mixture of heavy neutral stocks was dewaxed by passing it over the catalyst at 1 LHSV (liquid hourly space velocity) at an initial temperature of 570° F. At 17 days on stream the temperature required to maintain specification pour point had increased to 650° F., at which point this cycle was terminated and the catalyst regenerated by contact for 24 hours in flowing hydrogen gas at about 900° F. A second dewaxing cycle was initiated and continued for 19 days, at which time the required reactor temperature had reached 675° F. The run was then terminated and the catalyst removed without subjecting it to a hydrogen flush or a solvent wash.

One portion of the deactivated catalyst was extracted with THF (tetrahydrofuran) in a Soxhlet extractor.

Extracted and unextracted catalyst were then burned in air at progressively increasing temperature. The amount of residue removed as the burning progressed is shown in Table I.

TABLE I

| TEMPERATURE | Residue Removed, % of Initial Weight | |
|---|---|---|
| | Unextracted Catalyst | Extracted Catalyst |
| 200–350° C. | 19.5 | 1.5 |
| 350–525° C. | 6.0 | 2.5 |
| 525–700° C. | 5.5 | 6.0 |
| Total | 31.0 | 10.0 |

Example 2

A ZSM-5 type catalyst similar to that used in Example 1 and deactivated during dewaxing of a series of heavy and light neutral raffinates was regenerated at 800° F., 900° F. and 985° F. in flowing hydrogen at 400 psig for 24 hours (prior art). The results in terms of elemental analysis of the residue are shown in Table II. For comparison, the composition of a portion of the same catalyst not treated by the method of this invention but simply extracted with toluene, are included.

TABLE II

| | Hydrogen Regeneration RESIDUE ANALYSIS (g/100 g of fresh catalyst) | | | | |
|---|---|---|---|---|---|
| Element | Spent Catalyst | Extracted Catalyst | Regenerated Catalyst | | |
| | | | 800° F. | 900° F. | 985° F. |
| Carbon | 39.50 | 15.43 | 6.02 | 4.45 | 3.97 |
| Hydrogen | 6.18 | 2.32 | 0.73 | 0.48 | 0.44 |
| Nitrogen | 0.243 | 0.234 | 0.083 | 0.039 | 0.015 |
| Sulfur | 0.40 | 0.205 | 0.053 | 0.014 | — |
| Total | 46.323 | 18.189 | 6.886 | 4.983 | 4.425 |
| % Removed | | 60.7 | 85.1 | 89.25 | 90.5 |

Example 3

1.55 grams of a deactivated ZSM-5 lube dewaxing catalyst from dewaxing of a bright stock raffinate was extracted 3 times with hot toluene. The 1.16 grams of recovered extracted catalyst was shaken at room temperature with 5 ml of a solution of 6% KOH. The solid was separated, washed with water and then with hot toluene. Following this series of extractions, the catalyst (0.96 g) was sent for elemental analysis with the results shown in Table III.

TABLE III

| | Residue Composition (g/100 grams catalyst) | |
|---|---|---|
| Element | Deactivated | Reactivated |
| Carbon | 29.98 | 8.7 |
| Hydrogen | 3.96 | 1.32 |
| Nitrogen | 0.113 | 0.049 |
| Sulfur | 0.34 | 0.21 |
| Total | 34.393 | 10.279 |

Example 4

5.7 grams of a ZSM-5 catalyst deactivated during dewaxing a series of heavy and light neutral stocks was charged to a stainless steel tubular reactor and then heated to 100° C. in flowing helium for 1 hour. The catalyst was then flushed with 300 cc of a 0.4N NH$_4$OH solution was passed over th catalyst in flowing helium, at 400 psig, 80° C. over a 15 hour period. The system was then purged with helium and the temperature raised to 100° C. The catalyst was then flushed with 20 cc/hour toluene for 5 hours at 100° C., 400 psig followed by 100 cc/hour of heptane for two and a half hours at the same conditions.

Following vacuum drying (at 60° C., 10 mm Hg) 4.29 grams of catalyst was recovered representing a removal of at least 77% of the residue on the original catalyst.

Thermogravimetric analysis of the catalyst showed that it contained 0.22 meq NH$_3$/gram catalyst, i.e. about the same content as found with fresh catalyst.

Example 5

5.9 grams of the same deactivated catalyst as was used in Example 2 was charged to a stainless steel reactor and allowed to soak in toluene for three hours. The catalyst was then heated to 100° C. in flowing hydrogen at 400 psig and toluene was introduced at a rate of 92 cc/hr for two and a half hours. Anhydrous ammonia was then added to the hydrogen stream in the ratio 1.0 mole NH$_3$ to 99 moles of hydrogen. The 1% NH$_3$/H$_2$ toluene mixture was passed over the catalyst for two and a half hours (400 psig, 100° C.) after which the toluene was turned off overnight and turned on again the following morning. After one hour, the toluene flow was replaced by heptane.

The heptane extraction continued for three hours. Then small quantities of water as $H_2O$/toluene and $H_2$/heptane mixtures were passed over the catalyst before shutting the experiment down.

Table IV shows the amounts of material removed by each step of the process. Table V compares the catalyst residue composition before and after regeneration by the process of this invention.

The amount of chemisorbed ammonia is equal to 0.162 meq/gram compared to 0.177 meq/gram for the fresh catalyst. Hence, 92% of the acid sites have been coverted to the ammonium form.

TABLE IV

| Extraction Step | % of Residue Removed |
|---|---|
| Toluene, 100° C., $H_2$ | 60 |
| Toluene, 100° C., 1% $NH_3$ + $H_2$ | 18 |
| Heptane, 100° C., 1% $NH_3$ + $H_2$ | 9 |
| Total | 87 |

TABLE V

| | Residue Analysis (g/100 g of fresh catalyst) | |
|---|---|---|
| Element | Deactivated Catalyst | Reactivated Catalyst |
| Carbon | 39.50 | 5.00 |
| Hydrogen | 6.18 | 0.54* |
| Nitrogen | 0.243 | 0.07* |
| Sulfur | 0.40 | 0.08 |
| Total | 46.323 | 5.69 |
| % Removed | — | 87.5% |

*After subtraction of 0.46 g of chemisorbed ammonia/100 grams of sample.

Example 6

0.35 grams of toluene washed, used dewaxing catalyst (nitrogen content 0.233 grams/100 grams catalyst), 0.42 grams sodium chloride in 1.72 grams $H_2O$ and 2 grams of toluene were shaken at room temperature for 18 hours. The catalyst was filtered, washed twice with water, dried and sent for elemental analysis. The nitrogen content after treatment was 0.090 grams/100 grams catalyst, i.e. about 62% of the nitrogen was removed from the used catalyst by the described treatment.

It is evident from Example 2 (see Table II) that extraction with organic solvent can remove a large fraction (in this case 60 wt%) of the organic residue on a deactivated catalyst. However, this is accomplished with substantially no removal of nitrogenous compounds, which evidently are tenaciously sorbed.

Example 3 demonstrates that a large fraction of the nitrogenous residue may be removed by contacting the catalyst even at room temperature with aqueous potassium hydroxide followed by extraction with hot toluene. In this instance about 57% of the nitrogen is removed along with about 70% of the total residue.

Example 4 shows the use of aqueous ammonium hydroxide to produce a similar result.

Example 5 demonstrates the effectiveness of contact with anhydrous ammonia and organic solvent at the same time.

Example 6 demonstrates the effectiveness of sodium chloride as a source of sodium ion.

It appears from the above examples that the organic residue consists of a fraction extractable by organic solvent and tenaciously sorbed fraction which contains most if not all of the nitrogen compounds. While we do not wish to be bound by theory, the examples show that contact of the spent catalyst with a substance or solvent that provides a metal cation or a Lewis base capable of association with the acidic sites of the catalyst renders the tenaciously sorbed fraction extractable under surprisingly mild conditions. On extraction, the nitrogen content of the catalyst is markedly reduced as is its content of tenaciously sorbed organic residue.

Contemplated as useful treating agents are the alkali and alkaline earth metal cations, which include lithium, sodium, potassium, rubidium, caesium, calcium, magnesium, strontium and barium cations. A convenient source of these cations is an aqueous solution of the hydroxides or salts of the respective elements. Particularly preferred because of good solubility are the chlorides, acetates and nitrates since excess can be removed from the catalyst by rinsing with water. Contact of the catalyst with the foregoing cations is likely to result to some degree in their association with the acidic sites of the catalyst. In cases where this is objectionable, the alkali or alkaline earth residue may be removed by ion exchange with ammonium salt followed by calcination to give the hydrogen form of the catalyst. These base exchange and calcination procedures are well known to those skilled in the art.

In general, when the treating agent is contained in aqueous solution, it is desirable for better contacting efficiency to first remove the readily desorbed portion of the organic residue by extraction with organic solvent or by equivalent means, and then to contact the deactivated catalyst with the source of alkali metal cation or other treating agent.

Ammonia is a particularly useful treating agent. It may be employed as an aqueous solution, which contains ammonium hydroxide, as an aqueous solution of an ammonium salt, or as anhydrous ammonia. Anhydrous ammonia is particularly preferred since it lends itself to use with substantially anhydrous organic solvent, i.e. organic solvent free of a separate water phase. In all cases, the use of ammonia may result in some association with acidic catalyst sites, but regeneration of the hydrogen form of the catalyst is readily achieved by calcination.

Also contemplated as useful treating agents are alkylamines having up to four carbon atoms.

A wide variety of liquid organic solvents may be used to extract the nitrogenous residues after contact with a source of treating agent. Alcohols, ethers, esters, nitrites, furans and aliphatic or aromatic hydrocarbons may be used. Tetrahydrofuran is very effective, as are pentane, hexane, heptane and toluene. Paraffinic and aromatic hydrocarbons having up to eight carbon atoms are preferred.

A particularly preferred embodiment of this invention is to regenerate the catalyst by treatment with anhydrous ammonia together with a substantially anhydrous liquid paraffinic or aromatic solvent. With this embodiment the nitrogenous residues may be rendered extractable and removed from the catalyst in a single step. This embodiment is also particularly useful for the in situ regeneration of a deactivated catalyst.

The above described treatment and extraction steps may be conducted under a variety of conditions of time, temperature and pressure. Useful ranges of temperature for the treatment or extraction step are from about 20° C. to about 300° C. The treatment step and the extraction step may be conducted in one or more stages, and for a total time of from about one hour to about 100 hours for each step. The pressure may be from about 15 psig to about 750 psig. Hydrogen or an inert gas may be used. The combination of conditions are chosen so as to maintain the aqueous solution or liquid organic solvent, as the case may be, in the liquid phase. The mild conditions just described are sufficient to render a large fraction of the tenaciously sorbed nitrogen compounds extractable, without resort to prior heating of the catalyst at an elevated temperature such as 1000° F.

While this invention may be used to regenerate crystalline zeolite catalyst deactivated by use in a variety of processes, it is contemplated as most effective when deactivation occurs in a process that operates at a temperature of less than 850° F., such as in a catalytic dewaxing with an intermediate pore size zeolite catalyst operated at from about 475° F. to about 750° F. Generally the organic residues on such catalysts, if subjected to elemental analysis, will show an overall atomic ratio of hydrogen to carbon greater than about 1.30.

There may be some instances in which a catalyst regenerated by the method of this invention retains an undesirable level of organic residue. In such instances it is contemplated to reduce the level of residue by burning the catalyst for a short time in air, or by subjecting it to a short regeneration with hydrogen at a temperature of 800° to 1200° F. Regardless whether the method of this invention is used as the sole method of regeneration, or in some sequence in which conventional burning or hydrogen regeneration is used, an extension of catalyst life may be expected by virtue of the extremely mild conditions which prevail in the method of this invention.

Although we have described our invention in terms of regeneration of a deactivated catalyst, it is contemplated that the method of our invention may be used also to reactivate zeolites with tenaciously sorbed organic nitrogenous residues acquired by use of the zeolite as a sorbent rather than as a catalyst.

What is claimed is:

1. A method for regenerating a regenerable deactivated catalyst comprising a crystalline acidic zeolite, a carbonaceous residue, and tenaciously sorbed nitrogen compounds, said nitrogen compounds having been acquired from a petroleum or petrochemical hydrocarbon feed concomitant with catalytic conversion of said feed, which method comprises:

contacting said deactivated catalyst with a source of alkali metal or alkaline earth metal cations, ammonia, or mixtures thereof, whereby rendering said nitrogen compounds extractable;

extracting said extractable nitrogen compounds with a liquid organic solvent selected from the group consisting of alcohols, ethers, esters, nitrites, furans, tetrahydrofurans and paraffinic and aromatic hydrocarbons having up to eight carbon atoms, said contacting and extraction being conducted in the absence of said feed at about 20° C. to about 300° C. for about 1 hour to 100 hours;

and converting said extracted catalyst to the hydrogen form.

2. The method described in claim 1 wherein said zeolite has a silica to alumina ratio of at least 12 and a Constraint Index between about 1 and 12.

3. The method described in claim 2 wherein said crystalline zeolite is ZSM-5.

4. The method described in claim 2 or claim 3 wherein said deactivated catalyst is contacted with a source of sodium ions or ammonia.

5. The method described in claim 2 wherein said source of ammonia is anhydrous ammonia.

6. The method described in claim 3 wherein said source of ammonia is anhydrous ammonia.

7. The method described in claim 2 wherein said liquid organic solvent is a liquid hydrocarbon.

8. The method described in claim 3 wherein said liquid organic solvent is a liquid hydrocarbon.

9. The method described in claim 5 or claim 6 or claim 7 or claim 8 wherein said step of contacting said deactivated catalyst and said step of extracting said extractable nitrogen compounds are conducted substantially simultaneously.

10. The method described in claim 1 wherein said crystalline acidic zeolite has a silica to alumina ratio greater than 12, a Constraint Index between 1 and 12, and wherein said catalytic conversion is catalytic dewaxing at a temperature below about 850° F.

11. The method described in claim 10 wherein said deactivated catalyst is contacted with a source of alkali metal ions or ammonia.

12. The method described in claim 10 wherein said source of ammonia is anhydrous ammonia.

13. The method described in claim 10 wherein said liquid organic solvent is a liquid hydrocarbon.

14. The method described in claim 10 wherein said deactivated catalyst is contacted under substantially anhydrous conditions with a mixture of anhydrous ammonia and organic solvent.

15. The method described in claim 14 wherein the organic solvent is a liquid hydrocarbon.

16. The method described in claim 10 or claim 11 or claim 12 or claim 13 or claim 14 or claim 15 wherein said regeneration is conducted in situ.

17. The method described in claim 10 or claim 11 or claim 12 or claim 13 or claim 14 or claim 15 wherein said crystalline zeolite is ZSM-5.

* * * * *